US006694446B1

(12) United States Patent
Charrat

(10) Patent No.: US 6,694,446 B1
(45) Date of Patent: Feb. 17, 2004

(54) SYSTEM FOR SYNCHRONIZING A MICROPROCESSOR WITH AN ASYNCHRONOUS EVENT BY DETECTING AN AWAITED EVENT OCCURS AND IMMEDIATELY APPLYING LOAD SIGNAL TO A COUNTER THEREAFTER

(75) Inventor: Bruno Charrat, Aix-en-Provence (FR)

(73) Assignee: Inside Technologies, Saint Clément les Places (FR)

( * ) Notice: Subject to any disclaimer, the term of this patent is extended or adjusted under 35 U.S.C. 154(b) by 573 days.

(21) Appl. No.: 09/631,395

(22) Filed: Aug. 3, 2000

Related U.S. Application Data

(63) Continuation of application No. PCT/FR99/00145, filed on Jan. 26, 1999.

(30) Foreign Application Priority Data

Feb. 12, 1998 (FR) .............................. 98 01668

(51) Int. Cl.[7] ................................................. G06F 1/14
(52) U.S. Cl. ...................... 713/502; 713/400; 713/600
(58) Field of Search ................................. 713/400, 401, 713/500, 501, 502, 600; 377/19, 20, 28, 33, 37, 39; 714/30, 39

(56) References Cited

U.S. PATENT DOCUMENTS

| 4,559,636 A | * | 12/1985 | Goldrian ................. 377/20 |
| 5,481,230 A | | 1/1996 | Chang et al. |
| 5,781,769 A | * | 7/1998 | Weber ..................... 713/502 |
| 5,905,869 A | * | 5/1999 | Hornung et al. ........... 709/228 |
| 6,065,130 A | * | 5/2000 | Glitho ..................... 713/502 |

FOREIGN PATENT DOCUMENTS

| EP | 0 395 210 A | | 10/1990 | |
| EP | 752653 A2 | * | 1/1997 | .......... G06F/11/00 |
| JP | 01258057 A | * | 10/1989 | .......... G06F/15/16 |
| JP | 10260863 A | * | 9/1998 | .......... G06F/11/28 |

OTHER PUBLICATIONS

"Interpolation Between Periodic Measurements of Phase", Apr. 1, 1966, IBM Technical Disclosure Bulletin, vol. 8, No. 11, p. 1501.*
Anonymous, "High Speed Input/Output Delay Counter", *IBM Technical Disclosure Bulletin*, vol. 16, No. 6, pp. 1871–1873, Nov. 1973.

* cited by examiner

Primary Examiner—Thomas Lee
Assistant Examiner—Thuan Du
(74) Attorney, Agent, or Firm—Akin Gump Strauss Hauer & Feld, LLP

(57) ABSTRACT

The invention relates to a microprocessor (10) comprising a counter (TMR) to measure a time interval as a function of a counting instruction value (VAL) and a counting clock signal (H2). According to the invention, the microprocessor (10) comprises wired logic detection means (EVTDET) for the detection of at least one awaited event (E1, E2, E3), these means being arranged for the immediate application of a signal (LOAD) for the loading of a counting instructed value (VAL1, VAL2) to said counter when the awaited event takes place. Application especially to the management of a transmission of asynchronous data at a high bit rate in contactless chip cards.

15 Claims, 4 Drawing Sheets

PRIOR ART

SYSTEM FOR SYNCHRONIZING A MICROPROCESSOR WITH AN ASYNCHRONOUS EVENT BY DETECTING AN AWAITED EVENT OCCURS AND IMMEDIATELY APPLYING LOAD SIGNAL TO A COUNTER THEREAFTER

CROSS-REFERENCE TO RELATED APPLICATION

This application is a continuation of International Application No. PCT/FR99/00145 filed Jan. 26, 1999 the disclosure of which is incorporated herein by reference.

BACKGROUND OF THE INVENTION

The present invention relates to a microprocessor comprising a counter to measure a time interval as a function of an instructed value of counting and a counting clock signal.

The present invention relates more particularly to the synchronization of a microprocessor with an awaited asynchronous event, namely an event whose appearance or whose frequency of appearance is not synchronized with the internal clock of the microprocessor.

By way of an example, FIG. 1 shows a sequence of asynchronous bits comprising conventionally a start bit bs, with a value of zero, followed by bits b0, b1, b2, b3, etc. constituting a message. These different bits are separated by constant time intervals Te corresponding to the period of an external clock signal He. Conventionally, the sequence of bits is received with a lag of one half-cycle of the clock signal He and comprises the following steps:

detecting the passage to 0 of the bit bs (event E1, appearance of the start bit), when a time interval equal to Te/2 has elapsed since the event E1 (event E2), reading the bit bs and ascertaining that it is always equal to 0, when a time interval equal to Te has elapsed since the event E2 (event E3), reading the first bit b0 of the message, when a time interval equal to Te has elapsed since the event E3 (event E4), reading the second bit b1 of the message, etc.

FIG. 2 shows a schematic view of the implementation of this method by means of a microprocessor MP driven by a clock signal H1 with a period T1 that is not synchronized with the external clock signal He of the data transmission. At a port Pi, the microprocessor MP receives the sequence of bits of FIG. 1. A timer type counter TMR driven by a clock signal H2 with a period T2 records a counting instructed valve VAL when a loading signal LOAD is applied to it. When the counter TMR reaches the value 0 after the loading of the instructed value VAL, a flag FLZ of the counter goes to 0. This flag FLZ is applied to a port P2 of the microprocessor. With this standard arrangement, the method described here above is expressed by the following programming sequence expressed in general terms:

(1) when the port P1 goes to 0 (event E1, appearance of bit bs), loading the counter TMR with the counting instructed value VAL1, corresponding to a counting duration $VAL1_x T2$ equal to Te/2, (2) when the port P2 (flag FLZ) goes to 0 (event E2), loading the counter with a counting instructed value VAL2, corresponding to a counting duration $VAL2_x T2$ equal to Te, then reading the bit bs on the port P1 and ascertaining that the bit is truly equal to 0, (3) when the port P2 goes to 0 (event E3), loading the counter with the counting instructed value VAL2 and reading the bit b0 at the port P1, (4) when the port P2 goes to 0 (event E4), loading the counter with the counting instructed value VAL2, then reading the bit b1 at the port P1, . . . (and so on for the reading of the following bits).

In the above sequence, each new counting instructed value VAL2 or VAL2 is loaded immediately after the performance of each event and before the reading of the bits, in order to prevent a gradual lagging of the program with respect to the flow of asynchronous binary data. Despite this precaution, a temporal lag may arise between the time when the awaited event is actually reached and the time when this event is detected, namely the time when the "when" condition is met in the above program. This lag can be attributed to standard methods of event detection by polling or by interruption. It may be recalled that polling consists of a cyclical monitoring, by means of a program loop, of a point of the microprocessor, for example the ports P1 and P2. This method requires the performance of several machine cycles (clock H1). The lag that appears between the performance of the event and its actual detection is random. It may be zero if the event occurs at the exact time of the polling of the port or, if not, it may be equal to one or more machine cycles. The method of detection by interruption consists of the association of a priority interruption signal with the event to be detected. When the event occurs, the microprocessor is made to go to an interruption subprogram for the loading of the counter. This subprogram includes a certain number of operations to be performed as well as a GOTO type instruction taking the operation to the rest of the program to be executed. This method, like the previous one, causes a lag between the time when the event occurs and the time when a new counting instructed value is actually loaded into the counter.

Furthermore, the loading of a counter is not an instantaneous operation and introduces an additional lag. Indeed, the microprocessor must read the counting instructed value, apply it to a data bus to present it to the input of the counter and then apply the loading signal LOAD: these operations could amount to several machine cycles.

In many applications, these various lags are negligible as compared with the time intervals Te/2 and Te, the clock H1 of the microprocessor and the counting clock H2 being identical and very fast as compared with the external clock He. However, in the context of the making of a microprocessor designed for chip cards and other portable electronic devices, these delays may become critical and lead to malfunctioning. In particular, the microprocessors of contactless chip cards receive digital data at high bit rates by magnetic induction at a rate which, although it is lower than that of the internal clock H1, is so high that the number of machine cycles that could be lost in a polling loop or in a interruption subprogram is not negligible. Furthermore, in these applications, the external clock signal He of the transmission as well as the counting clock signal H2, extracted from the carrier frequency Fac of an alternating magnetic field, may be faster than the internal cock H1 of the microprocessor. The signals He and H2 may for example be 13 MHz signals and the internal clock H1 may be a 1 MHz signal.

The document EP 395 210 illustrates the drawbacks of the methods of event detection by interruption. In this document, data sent to a microprocessor is received in a FIFO stack of limited capacity. The filling of the FIFO stack is monitored by a counter which subtracts the number of "read in the stack" events from the number of "write in the stack" events. When the number of write operations minus the number of read operations crosses a certain threshold, an interrupt signal is sent in order to inform the microprocessor that the stack has to be emptied. This threshold is chosen to be below the capacity of the stack in order to take account of the relative slowness of the microprocessor in processing the interruption and to prevent an overflow of the stack. Furthermore, in this document, the data elements are received synchronously. Their reception does not require the monitoring of a port but the monitoring of the filling of the stack. The counter is an event counter (writing and reading of the stack) and is not a time counter.

SUMMARY OF THE INVENTION

Thus, it is a goal of the present invention to provide for a means enabling the precise synchronizing of a microprocessor with an asynchronous event or the synchronizing of a microprocessor with a clock that is faster than its internal clock.

This goal is attained by providing for a microprocessor of the above type, comprising wired logic detection means for the detection of at least one awaited event, these means being arranged to apply a signal for loading a counting instructed value to the counter as soon as the awaited event takes place.

Since these detection means are wired logic means and laid out so that the detection of one or more events prompts the updating of the counter, the lags caused by the standard methods of polling or interruption are overcome. Indeed, the reaction time of a wired logic circuit, namely the logic gate switching time, may be considered to be negligible.

In one embodiment, the detection means are arranged to detect the following events: the expiry of a time interval and the change in value of any logic signal.

According to one embodiment, the detection means are programmable and comprise at least one register to receive at least one code of at least one event to be detected.

According to one embodiment, the detection means comprise means to deactivate the microprocessor when they are activated and to reactivate the microprocessor when the awaited event occurs. Thus, the microprocessor is placed in a standby state while an event is being awaited, so as to reduce its electrical consumption.

According to one embodiment, the detection means deactivate the microprocessor by blocking the application of an internal clock signal to the core of the microprocessor.

According to one embodiment, the microprocessor comprises means for decoding and processing an event wait instruction, arranged so that upon reception of the awaited instruction: they present a counting instructed value at the input of the counter, give the detection means a code of the event to be detected and then activate the detection means.

According to one embodiment, the microprocessor comprises means of decoding and processing an event wait instruction comprising a code of the event to be detected as well as a counting instructed value given in direct or indexed form.

According to one embodiment, the detection means comprise means for the production of event codes when predetermined events occur at predetermined points of the microprocessor and means for comparing an event code delivered by the production means with the event code of an awaited event.

According to one embodiment, the counter receives a counting clock signal different from an internal clock signal of the microprocessor.

According to one embodiment, the microprocessor has means to extract the counting clock signal from the carrier frequency of an alternating magnetic field.

The present invention also relates to a method for the synchronization of a microprocessor with an awaited event, the microprocessor comprising a counter to measure a time interval as a function of a counting instructed value and a counting clock signal comprising the steps of: planning for a wired logic circuit to detect the awaited event; presenting a counting instructed value to the input of the counter; when the awaited event occurs, immediately applying, to the counter, a signal for the loading of the counting instructed value present at the input of the counter, the loading signal being delivered by the wired logic detection circuit with a minimum delay corresponding to a logic gate switching time.

According to one embodiment, the event corresponds to the flow of a time interval determined by a counting instructed value previously loaded into the counter.

According to one embodiment, the microprocessor is deactivated during the wait for an event.

According to one embodiment, the microprocessor is reactivated after the loading signal has been applied to the counter.

According to one embodiment, the microprocessor is deactivated and reactivated by the blocking and restoring of an internal clock signal applied to the core of the

BRIEF DESCRIPTION OF THE SEVERAL VIEWS OF THE DRAWINGS

These and other characteristics and advantages of the present invention shall be explained in greater detail in the following description of a microprocessor according to the invention, with reference to the appended figures, of which.

DETAILED DESCRIPTION OF THE INVENTION

According to the invention, the microprocessor 10 has a wired logic event detector circuit EVTDET detecting events that have to be taken into account during the execution of a program. As can be seen from the example given in the introduction, the term "event" conventionally designates a changing of the value of a logic signal at a point of the microprocessor. The event may be the passage to 0 of the signal, its passage to 1 or quite simply its change of state (from 1 to 0 or 0 to 1). Depending on needs and applications, the signal to be monitored must be taken at an internal bus or a port of the microprocessor, at the output of the counter TMR or it may be a flag of the microprocessor. The change in the value of the signal may itself be the awaited event or the translation into binary logic of any event on which the running of a program depends (for example the passage of a counting duration).

The detector EVTDET is connected by an input EV1 to the output of an event generator EVTGEN and, at another input EV2, it receives the code $CODE_{EW}$ of an event to be awaited, delivered by the unit CPU. The detector EVTDET delivers the loading signal LOAD from the counter TMR as well as a signal ED (event detected) signifying that an awaited event has occurred. Finally, the detector EVTDET is activated by a signal EW (event wait) of waiting for an event, delivered by the unit CPU.

The event generator EVTGEN is an encoder circuit whose inputs, in this case 16 inputs I1 to I16, are connected to various points to be monitored of the microprocessor. The generator EVTGEN delivers a code $CODE_{ED}$ of the event detected at the input EV1 of the detector EVTDET. This event is herein encoded on 4 bits.

Figure 1:
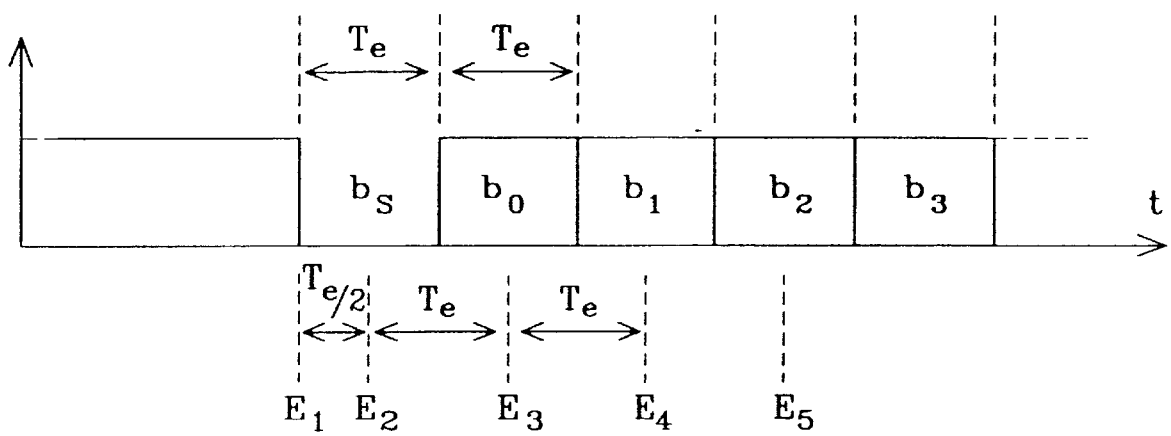
FIG. 1, described here above, represents the bits of an asynchronous data transmission.
Figure 2:
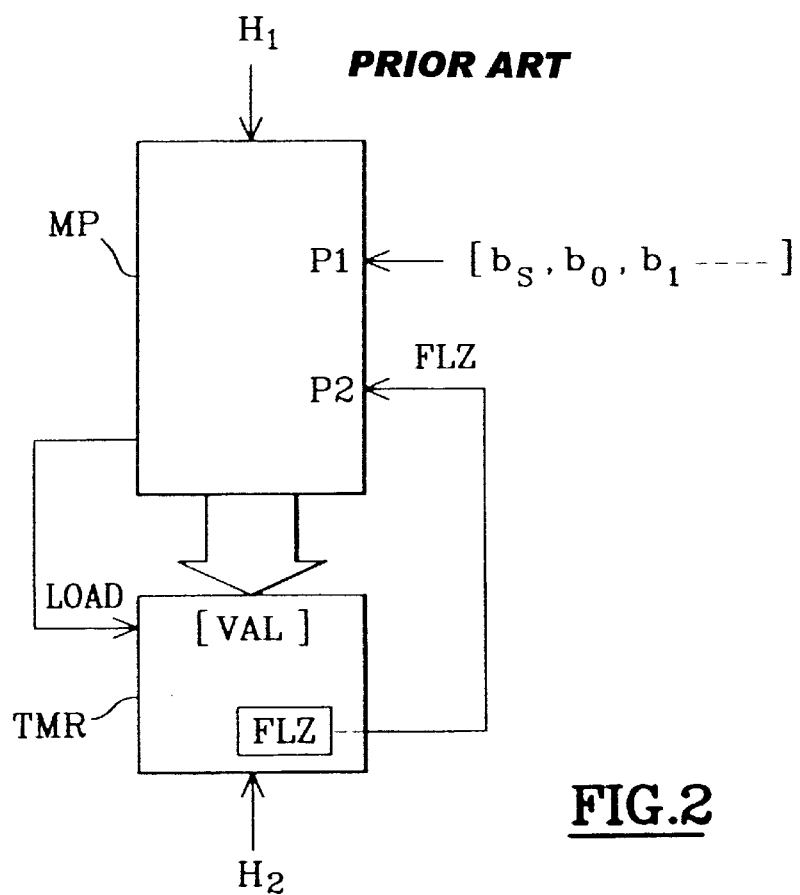
FIG. 2 is the standard diagram of a. microprocessor circuit configured for the detection of asynchronous data, FIG. 3 gives a view in the form of blocks of a microprocessor according to the invention comprising a system of synchronization according to the invention, FIG. 4 gives a more detailed view of certain elements of the system and microprocessor of FIG. 3.
Figure 3:
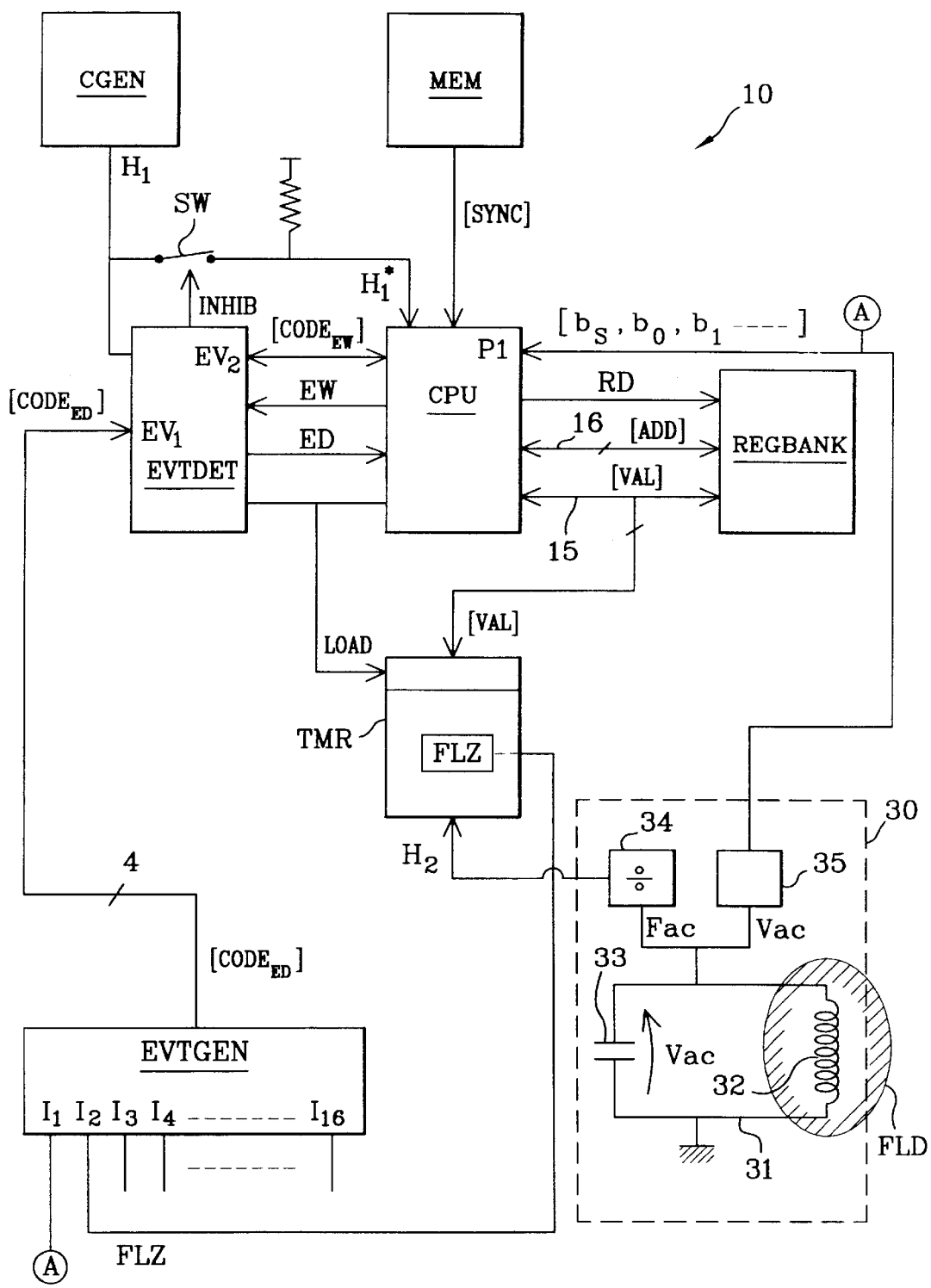
FIG. 3 shows a microprocessor 10 that conventionally comprises a central processing unit CPU connected to a data bus 15 and an address bus 16, a program memory MEM, a register bank REGBANK and a clock generator CGEN delivering the internal clock signal H1 of the microprocessor, applied to the unit CPU. The figure also shows the counter TMR described in the introduction, driven by a counting clock signal H2. The bank REGBANK and the counter TMR are connected to the data bus 15 as peripheral elements of the unit CPU, and addresses ADD of registers may be sent to the bank REGBANK by means of the address bus 16.

The diagram of FIG. 3 illustrates an application of the invention corresponding to the technical problem described in the introduction, namely the reception of asynchronous data by a contactless chip card microprocessor. FIG. 3 thus shows a standard circuit 30 for the transmission of data by magnetic induction, comprising a resonant circuit 31 formed by an antenna coil 32 and a parallel capacitor 33 as well as a divider circuit 34 and a decoder/demodulator circuit 35 connected to the terminals of the resonant circuit. When the coil 32 is plunged into an alternating magnetic field FLD with an amplitude-modulated frequency Fac emitted by a chip card reader, an induced alternating voltage Vac appears. The frequency Fac of the voltage Vac is divided by the circuit 34 which delivers the counting clock signal H2 (the ratio of division may be equal to 1). The circuit 35 demodulates the voltage Vac and decodes the signal received to extract therefrom the bits bs, b0, b1, b2, etc. of a sequence of asynchronous bits (FIG. 1). The output of the circuit 35 is applied to a port P1 of the unit CPU. In this application, the input I1 of the event generator EVTGEN is connected to the port P1 of the unit CPU (node A) and the input I2 is connected to the output of the counter TMR delivering the flag FLZ. The generator EVTGEN is designed to deliver an event code CED1 when the signal present at the port I1 goes to 0 and an event code CED2 when the flag FLZ goes to 0. The program sequence described in the introduction, relating to the reception of the sequence of bits bs, b0, b1, etc. with a period Te, is executed as follows:

i) the unit CPU sends the detector EVTDET the code:
   $CODE_{EW}$=CED1
of the first event E1 to be awaited (corresponding to the appearance of the start bit bs on the port P1), ii) the unit CPU sends the count instruction value VAL1 on the bus 15 (corresponding to the counting of a time Te/2) which is thus at the input of the counter TMR (the instructed value may optionally be registered in a buffer register of the counter TMR), iii) these preparatory steps being performed, the unit CPU activates the detector EVTDET by means of the signal EW.

Some instants later, the passage to 0 of the port P1 is detected by the generator EVTGEN which immediately delivers the code:

$CODE_{ED}$=CED1
of the detector EVTDET. This detector compares the code CED1 with the code $CODE_{EW}$ of the event to be monitored. With the identity of the codes being verified, the detector EVTDET immediately delivers the signal LOAD to the counter TMR and then delivers the signal ED, indicating that the awaited event has occurred, to the unit CPU. The term "immediately" is understood to mean an almost instantaneous operation performed in a short time interval corresponding to the switching time of the various logic gates that constitute the circuits EVTGEN and EVTDET.

Thus, through the invention, the loading of the instructed value VAL1 into the counter TMR is practically simultaneous with the performance of the awaited event. After receiving the signal ED, the unit CPU continues the execution of the program registered in the memory MEM, namely it prepares the wait for the following event E2 (corresponding to the elapsing of the time interval Te/2). To this end, the unit CPU repeats the operations i) and ii) here above. The value of VAL2 (the wait during a time Te) is now presented to the input of the counter TMR and the event code given to the detector EVTDET is the code CED2. When the flag FLZ goes to 0, the instructed value VAL2 is immediately loaded into the counter TMR and the unit CPU reads the bit bs. The operations for reading the following bits b0, b1, . . . (events E3, E4, etc.) are identical to the preceding one and are repetitive.

In short, by planning for a specific wired logic circuit to detect the events and immediately activate the loading of the counter TMR, it is possible to prevent an accumulation of delays that could lead to the loss of a bit.

These advantages of the invention are seen again for the sending of a sequence of bits according to that of FIG. 1. In this case, the unit CPU sends the event code VAL2 (FLZ=0) to the detector EVTDET, prepares the value VAL2 at the input of the counter TMR, itself applies the signal LOAD to the counter TMR and simultaneously applies the activation signal EW to the detector EVTDET. When the time Te is over and the flag FLZ goes to 0, the instructed valve VAL2 is always present at the input of the counter TMR and is automatically reloaded by the detector EVTDET. The detector EVTDET then sends the signal ED to the unit CPU which sends the first bit b0. Through the invention, the delay that can come about between the passage to 0 of the flag FLZ and the sending of a bit b0, b1, b2, b3, etc. by the unit CPU is not cumulative because this delay does not concern the counter TMR which is reloaded immediately after the expiry of the preceding time interval.

Furthermore, according to an optional but advantageous aspect of the invention, the core of the microprocessor, in this case the unit CPU, is deactivated during the periods of waiting for an event. In the embodiment shown in FIG. 3, this deactivation is obtained by eliminating the application of the internal clock H1 at the unit CPU by means of a switch SW. The switch SW is driven by the detector EVTDET and placed in the open state (off) when the detector EVTDET receives the activation signal EW and then is again closed when the awaited event occurs (sending of the signal ED) Thus, during the periods of waiting for an event, the microprocessor is deactivated and consumes no current.

Figure 4:
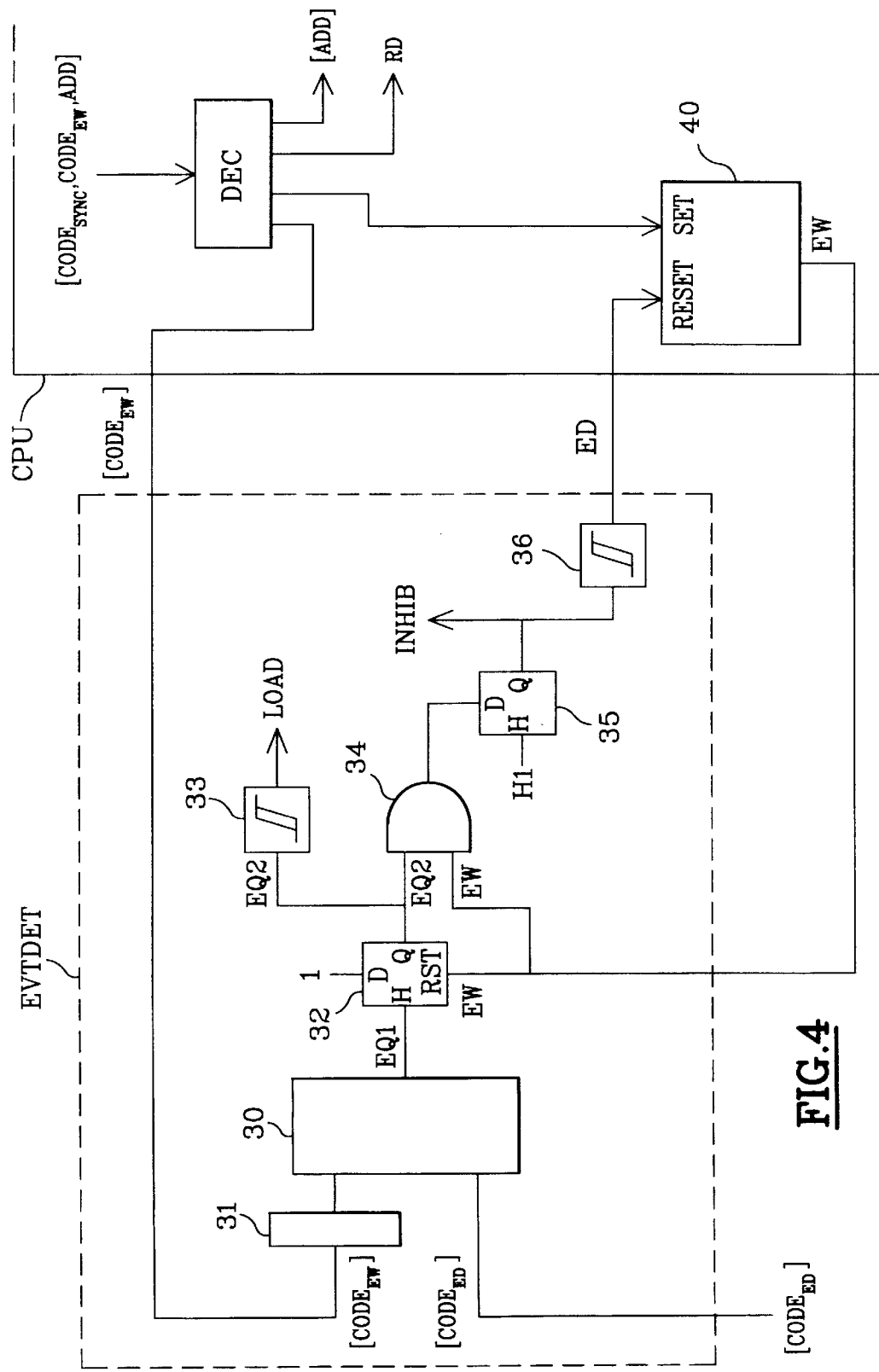

FIG. 4 illustrates an exemplary embodiment of the detector EVTDET. The input EV1 of the detector is connected to a first input of a logic comparator 30. The input EV2 is connected to a second input of the comparator 30 by means of a buffer register 31 to preserve the code $CODE_{EW}$ at the input of the comparator 30. The output of the comparator 30 delivers a signal EQ1 applied to the clock input H of a D type flip-flop circuit referenced 32 whose D input is held at 1. The flip-flop circuit 32 receives the activation signal EW at its resetting input RST and delivers a signal EQ2 at its output Q. The signal EQ2 is applied to the input of a monostable circuit 33 delivering the signal LOAD as well as to the input of an AND gate 34 receiving the activation signal EW at its other input. The output of the AND gate 34 is applied to the D input of a D flip-flop 35 receiving, at its clock input H, the internal clock signal H1 of the microprocessor. The Q output of the flip-flop 35 delivers a driving signal INHIB of the switch SW (see also FIG. 3). The signal INHIB is also applied to the input of a monostable circuit 36 whose output delivers the signal ED (detected event). Finally, the flip-flop circuits 32 and 35 are trailing edge circuits, i.e. they are activated by the passage to 0 of their respective H clock inputs, the Q outputs then copying the D inputs.

Figure 5:
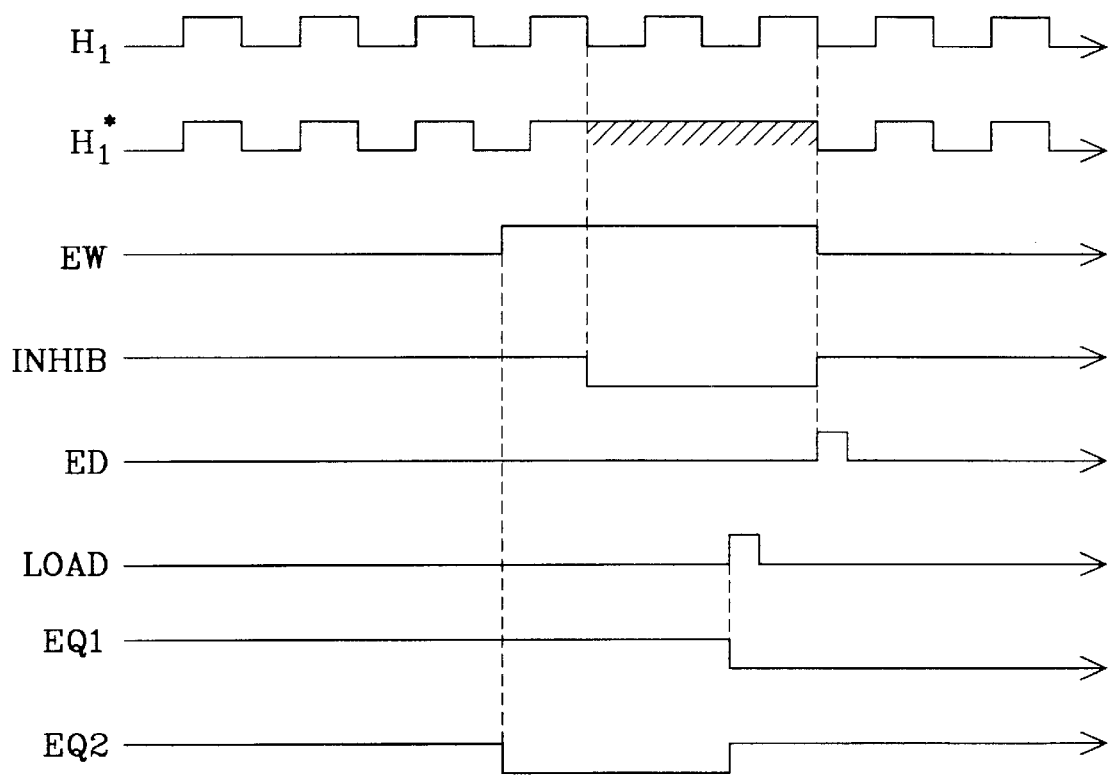
FIG. 5 is a timing diagram illustrating various logic signals that appear in the synchronization system of FIG. 3.

The working of the detector EVTDET is illustrated by the timing diagram of FIG. 5. The activation signal EW, which is normally at 0, is set at 1 by the unit CPU after the loading of an event code $CODE_{EW}$ in the buffer register 31. The signal EQ2 goes to 0, as also the output of the gate 34. At this point in time, it is assumed for example that the internal clock signal H1 is at 0. During the next trailing edge of the clock signal H1, the flip-flop circuit 35 gets activated and copies, at output, the value 0 present at its D input. The signal INHIB goes to 0 and the switch SW is open, so that the unit CPU no longer receives the clock signal H1 (in FIG. 5 the clock signal received by the unit CPU is referenced H1, to distinguish it from the permanent signal H1 delivered by the generator CGEN).

When the awaited event occurs, the codes $CODE_{EW}$ and $CODE_{ED}$ are equal and the signal EQ1 goes to 0. The signal EQ2 goes to 1 and the output of the monostable circuit 33 delivers the loading signal LOAD in the form of a pulse. Simultaneously, the output of the AND gate 34 goes to 1. At this point in time, it is once again assumed that the internal clock signal H1 is at 0. During the next trailing edge of the clock signal H1, the flip-flop circuit 35 gets activated and copies, at output, the value 1 present at its D input. The signal INHIB goes to 1 and the switch SW is closed so that the unit CPU is reactivated. Simultaneously, the monostable circuit 36 delivers the signal ED (event detected) to the unit CPU in the form of a pulse.

Thus, the embodiment that has just been described enables the interruption and restoration of the clock signal H1 at the same time, herein on a trailing edge of the clock, so that the working of the unit CPU is not disturbed. More specifically, the unit CPU does not notice that it had been deactivated and resumes operations at the point where it had been interrupted by its deactivation. Thus, the wait for an event does not require any polling of the signal ED and the reactivation of the unit CPU is immediate after the sending of the signal ED.

The right-hand part of FIG. 4 gives a very schematic view of the internal structure of the unit CPU. It contains the instruction decoder DEC and a D flip-flop circuit 40 whose Q output delivers the signal EW (event wait). The decoder DEC which is itself a standard one has the function of interpreting the instructions received from the program memory MEM and of setting the rate of their execution within the unit CPU.

According to yet another optional but advantageous aspect of the invention, the decoder DEC is organized so that it can process a synchronization instruction SYNC of the following type:

| $CODE_{SYNC}$ | $CODE_{EW}$ | ADD |
|---|---|---| comprising an operation code $CODE_{SYNC}$, the code CODE EW of a event to be awaited and an address ADD of a register of the bank RECBANK containing a counting instruction VAL.

The decoder DEC, after the reading ("fetch") cycle of the instruction SYNC in the memory MEM and the recognition of the code $CODE_{SYNC}$, carries out the following operations:

the decoder DEC stores the event code $CODE_{EW}$ in the register 31 of the detector EVTDET, the decoder DEC sends the address ADD to the address bus 16 and then applies the read signal RD to the bank REGBANK. The counting instructed value VAL present at this address is presented by means of the data bus 15 to the input of the counter TMR (it can also be loaded into a buffer register of the counter TMR), then, the decoder DEC activates the detector EVTDET by sending a voltage pulse to the input SET of the flip-flop circuit 40. The signal EW goes to 1. When the awaited event occurs, the pulse ED delivered by the detector EVTDET (monostable circuit 36) is applied to the input RESET of the flip-flop circuit 40. This prompts the resetting of the signal EW.

Providing for an instruction SYNC of this kind and a decoder DEC capable of executing this instruction is a practical aspect of the invention that considerably simplifies the work of a programmer and makes use, at all times, of the synchronization function according to the invention.

Naturally, the present invention can find numerous applications other than the one just described with respect to the technical problem explained in the introduction. For example, the invention can be applied to the synchronization of asynchronous processors that do not have the same clock frequency. In general, the invention can be implemented in any type of microprocessor and may advantageously replace the standard methods of synchronization by polling or interruption.

The present invention is open to a variety of variants and embodiments. The instruction SYNC described here above may contain a counting instructed value in indexed form represented by the address of a register. It is also possible to directly incorporate the instructed value of counting in the instruction SYNC. Furthermore, the event detector may be a more complex structure that can be used to simultaneously await two events. In this case, it is possible to superimpose the wait for an event pertaining to the change in value of a logic signal with a wait for an event corresponding to the lapse of a time interval. This variant is used to define a temporal waiting window and prevent the microprocessor from staying blocked in a state of deactivation if the awaited event does not occur.

Finally, those skilled in the art will note that the structure of the event detector described here above is very close to that of a standard interruption decoder, except that an interruption decoder has the function of generating an interruption signal and the address of an interruption subprogram when an awaited event occurs. Thus, an advantageous embodiment of the invention consists of the combining in a single circuit of the function of a standard interruption decoder and the function of a detector of events according to the invention.

I claim:

1. A microprocessor (10) comprising:

a counter (TMR) to measure a time interval (Te/2, Te) as a function of a counting instructed value (VAL1, VAL2) and a counting clock signal (H2), the counter being designed to load an external counting instructed value (VAL1. VAL2) when receiving a load signal (LOAD), and wired logic detection means (EVTDET, EVTGEN) for the detection of at least one awaited event (E1, E2, E3), said detection means being configured to immediately apply of said a load signal (LOAD) to said counter when the awaited event takes place.

2. A microprocessor according to claim 1, wherein said detection means are configured to detect the following events (E1, E2, E3):

the expiry of a time interval (Te2/Te), and the change in value of any logic signal.

3. A microprocessor according to claim 1, wherein the detection means (EVTDET, EVTGEN) are programmable and comprise at least one register (31) to receive at least one code ($CODE_{EW}$) of at least one event to be detected.

4. A microprocessor according to claim 1, wherein said detection means comprise means (INHIB, SW) to deactivate the microprocessor when they are activated and to reactivate the microprocessor when the awaited event occurs.

5. A microprocessor according to claim 4, wherein the detection means deactivate the microprocessor by blocking the application of an internal clock signal (H1) to the core (CPU) of the microprocessor.

6. A microprocessor according to claim 1, characterized in that it comprises means (DEC) for decoding and processing an event wait instruction (SYNC), arranged to, upon reception of said waiting instruction:

present the counting instructed value (VAL1, VAL2) at the input of the counter, give said detection means (EVTDET, EVTGEN) a code (CODEEW) of the event to be detected and then activate (EW) the detection means.

7. A microprocessor according to claim 6, comprising means (DEC) of decoding and processing an event wait instruction (SYNC) comprising a code ($CODE_{EW}$) of the event to be detected as well as said counting instructed value (ADD, VAL), which is given in a direct form (VAL) or in an indexed form (ADD).

8. A microprocessor according to claim 1, in which the detection means (EVTDET, EVTGEN) comprise:

means (EVTGEN) for the production of event codes ($CODE_{ED}$) when predetermined events occur at predetermined points of the microprocessor, and means for comparing an event code ($CODE_{ED}$) delivered by the production means (EVTGEN) with the event code ($CODE_{EW}$) of an awaited event.

9. A microprocessor according to claim 1, wherein the counting clock signal (H2) applied to the counter is different from an internal clock signal (H1) of the microprocessor.

10. A microprocessor according to claim 1, comprising means (31, 34) to extract the counting clock signal (H2) from a carrier frequency (Fac) of an alternating magnetic field (FLD).

11. A method for the synchronization of a microprocessor with an awaited event (E1, E2, E3), the microprocessor comprising a counter (TMR) to measure a time interval (Te/2, Te) as a function of a counting instructed value (VAL1, VAL2) and a counting clock signal (H2), the counter being configured to load an external counting instructed value (VAL1, VAL2) present on an input when receiving a load signal (LOAD), the method comprising:

planning for a wired logic circuit (EVTDET) to detect the awaited event;

presenting the counting instructed value (VAL1, VAL2) to the input of the counter (TMR), and when the awaited event occurs, immediately applying, to the counter (TMR), said load a signal (LOAD) to the counter (TMR), the loading signal (LOAD) being delivered by the wired logic detection circuit (EVTDET) with a minimum time limit corresponding to a logic gate switching time.

12. A method according to claim 11, wherein said event (E2, E3) corresponds to the flow of a time interval (Te/2, Te) determined by the counting instructed value (VAL1, VAL2) previously loaded into the counter (TMR).

13. A method according to claim 11, wherein the microprocessor is deactivated (INHIB) during the wait for an event.

14. A method according to claim 13, wherein the microprocessor is reactivated after the loading signal (LOAD) has been applied to the counter (TMR).

15. A method according to claim 14, wherein the microprocessor is deactivated and reactivated by the blocking and restoring of an internal clock signal (H1) applied to the core (CPU) of the microprocessor.

* * * * *